United States Patent [19]
Backa et al.

[11] Patent Number: 5,966,837
[45] Date of Patent: Oct. 19, 1999

[54] WOOD DRYING PLANT AND A METHOD OF PURIFYING A DRYING GAS FROM A WOOD DRYING DEVICE

[75] Inventors: Stefan Backa, Vasterås; Ulf Persson, Örsundsbro, both of Sweden

[73] Assignee: ABB Fläkt AB, Stockholm, Sweden

[21] Appl. No.: 08/851,627

[22] Filed: May 6, 1997

[30] Foreign Application Priority Data

May 6, 1996 [SE] Sweden .................................. 9601721

[51] Int. Cl.⁶ ....................................................... F26B 3/00
[52] U.S. Cl. ................................ 34/469; 34/478; 34/77; 34/78; 34/79; 34/85
[58] Field of Search .......................... 34/337, 408, 469, 34/478, 480, 77, 78, 79, 80, 85, 86; 159/29; 202/176, 179, 235; 203/18, 22, 23; 55/261, 263; 95/268, 273, 283

[56] References Cited

U.S. PATENT DOCUMENTS

| | | | |
|---|---|---|---|
| 3,811,200 | 5/1974 | Hager | 34/337 |
| 5,271,162 | 12/1993 | Kunz et al. | 34/493 |
| 5,603,751 | 2/1997 | Ackerson | 34/82 |
| 5,697,167 | 12/1997 | Kunz et al. | 34/86 |

*Primary Examiner*—Henry A. Bennett
*Assistant Examiner*—Steve Gravini
*Attorney, Agent, or Firm*—Stanger & Dreyfus, P.C.

[57] ABSTRACT

The device relates to a wood drying plant comprising a wood drying device and a purifying device which is arranged to receive a drying gas from the wood drying device, the drying gas comprising water steam and volatilized organic components such as terpenes, and to purify the drying gas from organic components and to recover the latter. The purifying device comprises at least one condenser which is arranged to separate relatively difficultly volatilized components containing organic components and relatively easily volatilized components. The purifying device also comprises a separating device which is arranged to separate said organic components and a rest material from the relatively difficultly volatilized components. The purifying device also comprises a transferring device which is arranged to transfer organic components present in the rest material to the drying gas introduced in the purifying device.

29 Claims, 1 Drawing Sheet

5,966,837

WOOD DRYING PLANT AND A METHOD OF PURIFYING A DRYING GAS FROM A WOOD DRYING DEVICE

THE FIELD OF THE INVENTION AND PRIOR ART

The present invention relates to a wood drying plant comprising a wood drying device and a purifying device which is arranged to receive a drying gas from the wood drying device, said drying gas comprising water steam, volatilized organic components such as terpenes, and possibly glue rests, such as formaldehyde, and a method of purifying a drying gas from a wood drying device, said drying gas comprising water steam, volatilized organic components such as terpenes and possibly glue rests such as formaldehyde.

During wood drying, organic compounds, such as terpenes, are emitted from the wood material in addition to water. Drying gases containing these organic compounds have until approximately ten years ago been discharged directly to the surrounding environment. However, the terpenes there react with nitrogen monoxide and form ozone close to the ground, which has a negative effect upon the vegetation. Ozone close to the ground causes serious damage to woods and also in the long term leads to the death of forests. In recent years the problems with ozone have been noted and measures have been taken to develop plants and methods that contribute to avoiding the production of ozone close to the ground.

According to EP 0 457 203 a drying gas comprising water steam, air gases and volatilized organic components is conducted to a condenser where a condensate is separated. Non-condensed gases and water steam are further conducted from the condenser together with combustion air to a combustion chamber. There, volatilized organic components are combusted to form carbon dioxide and water and are released into the atmosphere together with the air gases. Accordingly, the method prevents organic components, such as terpenes, from being discharged into the atmosphere during wood drying and thereby reacting in such a way that they form ozone close to the ground. However, the method does not make a recover of the organic components, for example the terpenes, possible as these are combusted in the combustion chamber.

It has been known for several decades to treat gases from sulphate pulp mills, said gases comprising organic compounds such as terpenes. The reason for beginning to treat these gases at an early time was that they caused significant smell problems as they were discharged directly to the atmosphere. At that time there was only very delimited knowledge about which environmental problems that could be caused by organic components in the atmosphere, and, probably, the purification would never have been done if the directly discharged gases would not have caused smell problems.

It is also known to recover terpenes during purification of gases from sulphate pulp mills. The recover of terpenes from gases from such mills was started because, due to the smell problems already mentioned, it was necessary to treat the gases and because the gas flows resulted in that a recover of terpenes was profitable from an economic point of view. However, terpenes recovered from sulphate pulp mills are contaminated by sulphuric compounds, which makes the purification of the terpenes expensive and complicated.

During wood drying, direct discharges of drying gases do not cause any significant smell problems, and as the drying gas flows are small there has not been any reason to develop methods for recovering terpenes from the drying gases until recent years, when drying gases should be purified because of environmental reasons. SE 502 081 describes such a method. The gas mixture, evaporated from the wood material and containing water, terpenes and possibly other volatile agents is thereby discharged from the drying plant and cooled in a condenser at a pressure where water but substantially not the terpenes condense, whereby a first condensate is obtained. The rest gas containing the main part of the terpenes is then subjected to such a substantially higher pressure that also the terpenes condense, whereby a second condensate is obtained, out of which terpenes are recovered. However, the first condensate contains small amounts of terpenes, which results in the need of purifying it before it is discharged into watercourses, in order to prevent oxygen consuming agents from getting into the watercourses. The pressure at which the water but substantially not the terpenes condense is, according to the patent document, preferably generally the same as in the drying plant, which is preferably formed by a vacuum drier.

Accordingly, prior art does not offer any method of purifying a drying gas from organic components and recovering these components at the same time as a condensate, which is generally free from the organic components, is separated.

SUMMARY OF THE INVENTION

An object of the present invention is to solve the above problems. More precisely, the object of the invention is to improve the possibilities of cleaning a drying gas and recovering organic components. Furthermore, the object of the invention is to accomplish a recover of heat generated during the purification.

These objects are obtained by means of the initially defined device, characterized in that the purifying device comprises at least one condenser device which is arranged to separate relatively difficultly volatilized components and relatively easily volatilized components from the drying gas by condensing the relatively difficultly volatilized components, a separating device which is arranged to separate said organic components and a rest material from the relatively difficultly volatilized components, and a transferring device which is arranged to transfer organic components present in the rest material from the rest material to the drying gas. Accordingly, the invention provides a plant which is arranged to purify the drying gas and recover the organic components in the drying gas. The existence of the transferring device results in a condensate comprising the water steam condensed from the drying gas in the purifying device becoming generally free from organic components thanks to the small amounts of organic components in the rest material being transferred to the drying gas in the transferring device. Thereby, the condensate may be discharged directly into a watercourse without causing any oxygen demanding decomposition of organic compounds.

According to one embodiment of the invention, the purifying device is arranged to operate under generally constant pressure. This is economically advantageous as pressure changes require extra equipment and extra energy.

According to another embodiment of the invention, the purifying device comprises means which are arranged to recover the heat emitted during the condensation. This means that hot water may be produced and used for heating purposes for instance.

According to another embodiment of the invention, the condenser device comprises a plurality of condensers and a connection between a previous condenser and a subsequent condenser, the connection being arranged to transport the components not condensed in the previous condenser. The provision of a plurality of condensers results in a more effective purification and reduces the risk that, in a final condenser, relatively easily volatilized components directly discharged into the atmosphere comprise organic components.

According to another embodiment of the invention, the condenser device comprises a plurality of condensers, and a condenser is provided between a first condenser and the transferring device, the connection being arranged to transport the relatively difficultly volatilized components from the first condenser to the transferring device in order to transfer organic components present therein to the drying gas. This embodiment also implies that the first condenser may be adapted to separate the water steam as relatively difficultly volatilized components but substantially not the organic components from the drying gas, whereby a significant part of the water steam in the drying gas can be extracted from the transferring device as a condensate which is generally free from organic components, without being forced to pass the separating device. This results in smaller amounts of water-based liquid passing the separating device, which results in a more efficient separation and recover of organic components in said separating device.

According to another embodiment of the invention, said separating device comprises a decanting device. The relatively difficultly volatilized components conducted to the separating device and condensed in the condensers comprise a mixture of water-based liquid and a liquid comprising organic components. Organic components have a low solubility in water, and therefore the mixture is constituted by two phases separated from each other, where the organic phase constitutes an upper phase and the waterbased phase constitutes a lower phase. Therefore, it is possible to decant the organic phase from the water-based phase by simple means, in order to recover the organic components. Thereby, the rest material is mainly constituted by the water-based liquid and organic components solved therein, the organic components only constituting small amounts of the water-based liquid due to their relatively low solubility in water. According to one application of the embodiment, the separating device comprises an extraction device, and according to another application it comprises an adsorption device.

According to another embodiment of the invention, the transferring device is arranged to transfer the organic components in the rest material to the drying gas through a direct contact between the rest material, which is in a liquid state, and the drying gas, the rest material separated from the organic components being extracted as a condensate.

According to another embodiment of the invention, the purifying device comprises a heat exchanger which is arranged to transfer heat from said condensate to a flow constituted by the rest material. The rest material from the separating device is thus preheated in the heat exchanger before it is conducted to the transferring device.

According to another embodiment of the invention, a connection is arranged between the condenser device and a combusting device, said connection being arranged to transport the relatively easily volatilized components to the combusting device. Possible organic components among the relatively easily volatilized components are thereby combusted to carbon dioxide and water, resulting in no organic components being discharged to the environment. According to an application of the embodiment, the combusting device is arranged to generate heat in the wood drying device as combustion gases from the combusting device are subjected to heat exchange with a flow in the wood drying device.

According to another embodiment of the invention, the wood drying device comprises a partly closed drying circuit.

According to another embodiment of the invention, the wood drying device comprises a generally closed drying circuit.

According to another embodiment of the invention, the wood drying device comprises a wood drier and a means which is arranged to separate drying goods, a connection being provided between said means and the purifying device and arranged to transport at least a part of the drying gas to the purifying device. The part of the drying gas that is not transported to the purifying device is recirculated in the wood drying device.

The initially defined method of the invention is characterized by the steps of separating relatively difficultly volatilized components from relatively easily volatilized components in the drying gas in at least one step by condensing the relatively difficultly volatilized components, separating said organic components and a rest material from the relatively difficultly volatilized components, and transferring the organic components included in the rest material to the drying gas in a transferring device. The method has the advantage that valuable organic components, such as terpenes, are recovered during a purification of the drying gas from the wood drying device. The transfer of the organic components in the transferring device to the drying gas thus results in generally all the organic components being recovered. According to one application of the method of the invention, the method takes place under a generally constant pressure.

According to one embodiment of the invention, the condensation takes place by means of affection from a cooling water circuit, whereby heat generated in the cooling water circuit is recovered. Thereby, the recovered heat may be used to produce hot water, for instance for heating purposes.

According to another embodiment of the invention, the rest material is heated in the transferring device by bringing it in direct contact with the drying gas introduced in the purifying device, the small amounts of organic components included in the rest material being evaporated and extracted from the transferring device together with the drying gas introduced in the purifying device. The transfer of these organic components in the rest material to the drying gas has the advantage that these organic components may be recovered in a simple way together with the organic components in the drying gas.

According to another embodiment of the method of the invention, the rest material is preheated before the small amounts of organic components included in this rest material are heated in such a way that they are transformed to a gaseous state. According to an application of the embodiment, the rest material separated from organic components in the transferring device is extracted as a condensate. Thanks to the transferring device, the condensate is generally free from organic components and may therefore be directly discharged into watercourses without causing negative environmental affection. According to another application of the embodiment of the method, the rest material is preheated by being subjected to a heat exchange with the condensate from the transferring device.

According to another embodiment of the method of the invention, the condensing of the relatively difficultly volatilized components of the drying gas takes place in a plurality of steps, the relatively easily volatilized components from a preceding step being separated into relatively difficultly volatilized components and relatively easily volatilized components in a subsequent step as the relatively difficultly volatilized components are condensed in the subsequent step. The advantage of executing the condensation in a plurality of steps is that it is possible to obtain relatively easily volatilized components in a final step, where those components are generally free from organic components and, therefore, may be discharged directly into the air without generally resulting in any negative environmental affection.

According to another embodiment of the method of the invention, the condensation of the relatively difficultly volatilized components of the drying gas takes place in a plurality of steps, and the relatively difficultly volatilized components in the first step are heated by being brought into direct contact with the drying gas introduced into the purifying device, the organic components of the relatively difficultly volatilized components being evaporated and extracted from the transferring device together with the drying gas introduced into the purifying device. The rest material is extracted as a condensate which is generally free from organic components. The advantage of the embodiment is that it reduces the flow of water-based liquid to the separating device at the same time as the flow of the liquid comprising the organic components remains the same. Accordingly, the relation organic/water-based liquid is increased, thereby facilitating the separation of organic components in the separating device.

According to another embodiment of the method of the invention, organic components are separated from relatively difficultly volatilized components condensed in each condensation step.

According to another embodiment of the invention, relatively easily volatilized components from a final condensation step are combusted in a combusting device, combustion gases being formed. Organic components possibly present in the relatively easily volatilized components are thereby transformed into carbon dioxide and water, and thereby also emission to the air of small amounts of organic components possibly present is effectively prevented. According to an application of the embodiment, a flow in the wood drying device is heated by being subjected to heat exchange with the combustion gases.

According to another embodiment of the method of the invention, the organic components are separated by means of at least one of decanting, extraction and adsorption.

According to another embodiment of the method of the invention, the wood drying device operates under a slightly reduced pressure, atmospheric pressure or overpressure.

BRIEF DESCRIPTION OF THE DRAWINGS

The present invention will now be described more in detail with reference to embodiments shown in the attached drawings.

DETAILED DESCRIPTION OF EMBODIMENTS

Figure 1:
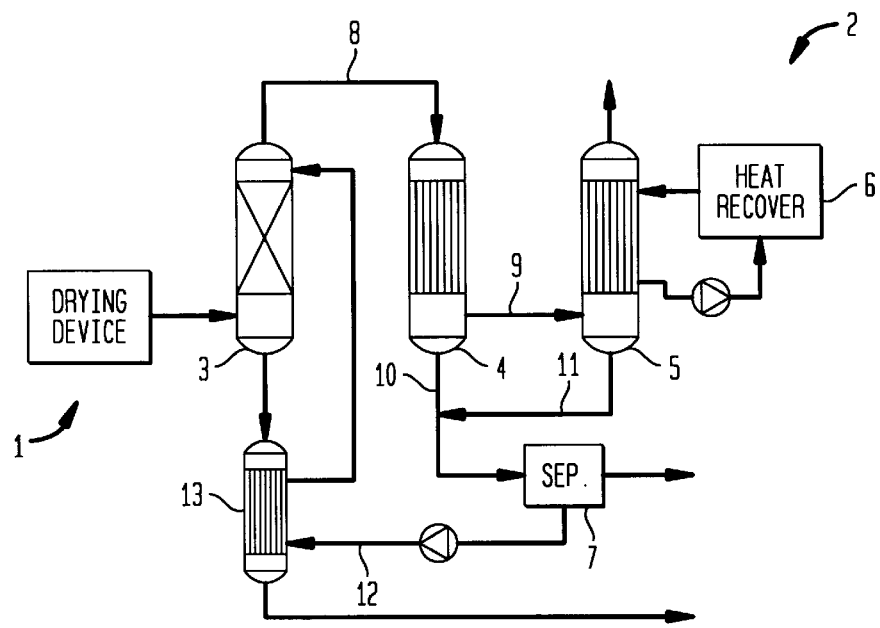
FIG. 1 shows a simplified schematic drawing of the wood drying device.

FIG. 1 shows a wood drying plant comprising a wood drying device 1 and a purifying device 2, the wood drying device 1 being constituted by a generally closed or partly closed drying circuit. The purifying device 2 comprises a transferring device 3, condensers 4 and 5, a means 6 arranged to recover heat emitted in the condensers 4 and 5, and a separating device 7. A drying gas from the wood drying device 1 and comprising water steam and volatilized organic components such as terpenes is conducted to the separating device 3 and further through a conduit 8 to the condenser 4, where the drying gas is separated into relatively easily volatilized components and relatively difficultly volatilized components, the major part of the organic components in the drying gas being found in the relatively difficultly volatilized components. The separation of relatively difficultly volatilized from relatively easily volatilized components is realised through condensation of the relatively difficultly volatilized components, the latter being transformed into a liquid phase. The relatively easily volatilized components in the condenser 4 are then conducted through a conduit 9 to the condenser 5, where they are separated in relatively easily volatilized components and relatively difficultly volatilized components in the condenser 5 in the same way as in the condenser 4, the relatively easily volatilized components substantially not containing any organic components. The relatively difficultly volatilized components in the condensers 4 and 5, containing organic components, are conducted via conduits 10 and 11 to the separating device 7, where organic components such as turpentine, that is a terpene mixture, are separated from a water-based liquid. This is executed by means of at least one of the different methods decanting, extraction and adsorption. During decanting, the low solubility of organic components in water is employed. Accordingly, a mixture of turpentine and a water-based liquid comprises two phases, where the water-based liquid constitutes a lower phase and turpentine constitutes an upper phase. Thereby, the turpentine phase is decanted, a rest material of the mixture, comprising the water-based liquid and terpenes dissolved therein, remaining. This remaining material is then conducted through a conduit 12 to a heat exchanger 13 where it is heated by a condensate leaving the transferring device 3. The remaining material is then further conducted to the transferring device 3 where it meets the drying gas in counterflow, and terpenes dissolved in the rest material are transferred to the drying gas, after which they follow the latter to the condenser 4. The transfer of the terpenes to the drying gas mainly takes place thanks to concentration differences. The rest material evaporated from terpenes, is extracted at the bottom of the transferring device 3 as a condensate. The relatively easily volatilized components in the condenser 5, which components generally are constituted by air gases, are directly discharged into the atmosphere or combusted before discharge, possible easily volatilized hydrocarbons in the air gases being combusted to carbon dioxide and water.

In FIG. 1 it is also possible to substitute the two condensers 4 and 5 against one single condenser, or to introduce further condensers.

Figure 2:
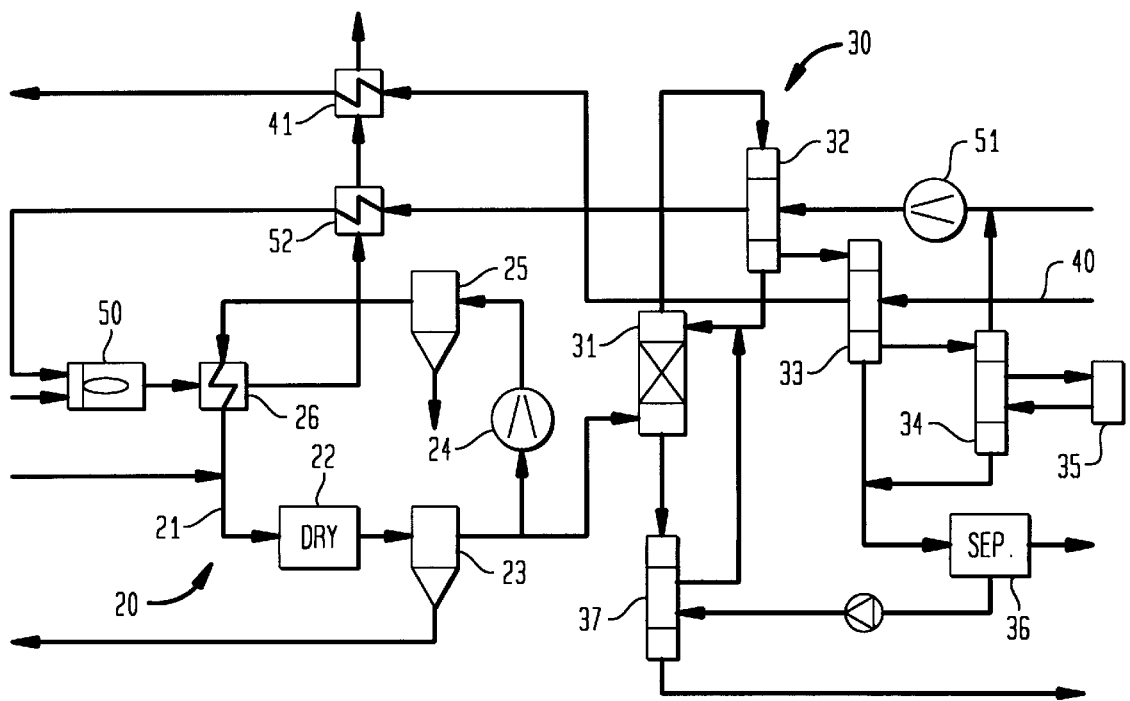
FIG. 2 shows a more detailed, schematic drawing of the wood drying plant.

FIG. 2 shows a wood drying plant comprising a wood drying device 20, a purifying device 30, a means 40 arranged for heat recover, and a combusting device 50.

The wood drying device 20 comprises an inlet 21 which is provided in order to introduce moist wooden material, a wood drier 22, a wood separating device 23, a fan 24, a dust separator 25 and a superheating device 26. The purifying device 30 comprises a transferring device 31, condensers 32, 33 and 34, a cooling device 35, a separating device 36 arranged to recover organic components, and a heat exchanger 37. The means 40 comprises an economizer 41, and the combusting device 50 comprises a fan 51 and an air preheater 52.

Moist wood material is introduced in the inlet 21 into the wood drying device 20 and conducted together with superheated air gases to the wood drier 22, where moisture and volatile organic components evaporate to the superheated air gases. The dry wood material and a drying gas containing the air gases, the evaporated water steam and the volatile components are then conducted to the wood separating device 23 where dry wood material is separated from the drying gas, whereafter the latter is transported by means of the fan 24 to the dust separator 25, where dust is separated. The drying gas generally free from dust after the dust separator 25 is then transported to the superheating device 26 in order to get superheated and become ready to dry moist wood material once again. A part of the drying gas from the wood separating device 23 is transported to the transferring device 31, whereafter the drying gas is conducted to the condenser 32, where it is cooled by means of flowing air for instance, in such a way that relatively difficultly volatilized components are separated from relatively easily volatilized components as the relatively difficultly volatilized components are condensed and, thereby, are transformed to a liquid phase. The relatively difficultly volatilized components from the condenser 32, which components are generally constituted by condensed water steam, are then conducted back to the transferring device 31, where they are brought into counterflow contact with the drying gas, organic components dissolved in the condensed water steam being transferred to the drying gas which is conducted to the condenser 32. The condensed water steam is removed from the transferring device 31 as a condensate generally free from organic components.

The relatively easily volatilized components in the condenser 32 are transported to the condenser 33 and there they are cooled by means of cooling water in such a way that relatively difficultly volatilized components in the condenser 33 are separated from relatively easily volatilized components as the relatively difficultly volatilized components, comprising the main part of the organic components from the drying gas, are transformed into a liquid phase. The relatively easily volatilized components in the condenser 33 are transferred to the condenser 34, where they are cooled by means of the cooling device 35 in such a way that, in the condenser 34, relatively difficultly volatilized components which among other things contain organic components are separated from relatively easily volatilized components as the relatively difficultly volatilized components are transformed into a liquid phase.

The relatively difficultly volatilized components from the condensers 33 and 34, which components comprise organic components, are then conducted to the separating device 36 for the recover of organic components. These relatively difficultly volatilized components are constituted by a mixture of a water-based liquid and a liquid with organic components and as these are very hard to solve in each other, they form two phases separated from each other, with the organic phase as an upper phase and the water-based liquid as a lower phase. The phase with the water-based liquid will thereby contain very small levels of organic components dissolved therein. The upper phase, that is the organic phase, is decanted and a rest material remains, which material is generally constituted by the water-based liquid and organic components dissolved therein. The organic components hereby recovered may be directly sold or purified in another device in order to get sold after that.

The rest material is then pumped to a heat exchanger 37 where it is preheated by the condensate deriving from the transferring device 31, and is then further conducted to the transferring device 31 in order to separate the organic components which are dissolved in the rest material. Thereby, the organic components in the rest material are transferred to the drying gas by being brought into direct contact with the drying gas in a counterflow direction, and are then transported with the drying gas to the condensers in order to recover organic components. The rest material, which is separated from the organic components in the transferring device 31, is extracted from the transferring device 31 as a condensate which is used to heat the rest material from the separating device 36 in the heat exchanger 37 before this material is further transported to the transferring device 31. The heating in the heat exchanger 37 makes sure that generally all the organic components in the rest material are volatilized in the transferring device 31. The condensate from the transferring device 31 is generally free from terpenes and other organic components, which means that it is so free from problems that it may be directly discharged into a watercourse without further purification and without causing any substantial oxygen consuming decomposition or other negative environmental affection in the watercourse.

The relatively easily volatilized components in the condenser 34 which components are mainly constituted by air gases but also may comprise low molecular hydrocarbons, are transported by means of a combustion air fan 51 together with possible further air to the condenser 32 in order to cool the latter. The mixture of relatively easily volatilized components from the condenser 34 and the air, thereby heated, is then transported to an air preheater 52 where it is subjected to heat exchange with flue gases from the combustion device 50 and then conducted to this combusting device 50 in order to get combusted together with a fuel. Thereby, possibly existing low molecular hydrocarbons are combusted into carbon dioxide and water, which is removed together with the rest of the flue gases. It is possible to fully or partly use the dried wood material from the wood separating device 23 as the fuel. The combustion gases from the combusting device 50 are conducted to the superheating device 26 where they are subjected to heat exchange with the drying gas separated from the dust, in order to superheat the drying gas and make it ready to dry moist wood material once again. The flue gases are then conducted from the superheating device 26 to the air preheater 52 where they are subjected to heat exchange with the mixture of the relatively easily volatilized components from the condenser 34 and the air, in order to heat this mixture.

Cooling water of the means 40, arranged for heat recover, is heated in the condenser 33, where it cools the relatively difficultly volatilized components from the condenser 32 in such a way that relatively difficultly volatilized components in the condenser 33 are condensed, the cooling water absorbing the heat emitted during the condensation. The heated cooling water is then possibly conducted from the condenser 33 to an economizer 41 where it is subjected to heat exchange with flue gases from the combusting device 50, whereby the hot water is further heated.

It is possible to use an extraction device or an adsorption device or to use a combination thereof instead of or together with the decanting device. However, the extraction device and adsorption device demand further equipment, which affects the cost of the plant.

It is possible to make the whole or part of the wood drying plant operate under a reduced pressure, atmospheric pressure or overpressure, and it is applicable to let at least the wood drying device 1 operate under a slight overpressure. Furthermore, it is possible to let the whole wood drying device operate under a generally constant pressure.

Furthermore, it is possible to "bleed off" drying gas from the wood drying device.

We claim:

1. A wood drying plant comprising a wood drying device and a purifying device which is arranged to receive a drying gas from the wood drying device, the drying gas comprising water steam and volatilized organic components, wherein the purifying device comprises at least one condenser device which is arranged to separate relatively difficultly volatilized components and relatively easily volatilized components from the drying gas by condensing the relatively difficultly condensed components; a separating device which is arranged to separate said organic components and a rest material from the relatively difficultly volatilized components; and a transferring device which is arranged to transfer organic components present in the rest material from the rest material to the drying gas.

2. A plant according to claim 1, wherein the purifying device is arranged to operate under a generally constant pressure.

3. A plant according to claim 1, wherein the purifying device comprises means which are arranged to recover the heat emitted by the condensation.

4. An plant according to claim 1, wherein the condenser device comprises a plurality of condensers and a connection between a previous condenser and a subsequent condenser, said connection being arranged to transport the components not condensed in the previous condenser.

5. A plant according to claim 1, wherein the condenser device comprises a plurality of condensers and that a connection is arranged between a first condenser and the transferring device, said connection being arranged to transport the relatively difficultly volatilized components in the first condenser to the transferring device for a transfer of organic components present therein to the drying gas.

6. A plant according to claim 1, wherein said separating device comprises a decanting device.

7. A plant according to claim 1, wherein said separating device comprises an extraction device.

8. A plant according to claim 1, wherein said separating device comprises an adsorption device.

9. A plant according to claim 1, wherein the transferring device is arranged to transfer the organic components in the rest material to the drying gas through a direct contact between the rest material, which is present in a liquid state, and the drying gas, the rest material separated from organic components being extracted as a condensate.

10. A plant according to claim 9, wherein the purifying device comprises a heat exchanger which is arranged to transfer heat from the condensate to a flow comprising said rest material.

11. A plant according to claim 1, wherein a connection is arranged between the condenser device and a combusting device, said connection being arranged to transport the relatively easily volatilized components to the combusting device.

12. A plant according to claim 11, wherein the combusting device is arranged to generate heat in the wood drying device as combustion gases from the combusting device are subjected to heat exchange with a flow in the wood drying device.

13. A plant according to claim 1, wherein the wood drying device comprises a partly closed drying circuit.

14. A plant according to claim 1, wherein the wood drying device comprises a generally closed drying circuit.

15. A plant according to claim 1, wherein the wood drying device comprises a wood drier and a means arranged to separate drying goods, a connection being arranged between said means and the purifying device and arranged to transport at least a part of the drying gas to the purifying device.

16. A method of purifying a drying gas from a wood drying device by introducing the drying gas into a purifying device, the drying gas comprising water steam and volatilized organic components, comprising the steps of separating relatively difficultly volatilized components from relatively easily volatilized components in the drying gas in at least one step by condensing the relatively difficultly volatilized components, separating the organic components and a rest material from the relatively difficultly volatilized components, and transferring the organic components included in the rest material in a transferring device to the drying gas.

17. A method according to claim 16, wherein the method takes place under a generally constant pressure.

18. A method according to claim 16, wherein the condensing takes place by the influence of a cooling water circuit, heat generated in the cooling water circuit being recovered.

19. A method according to claim 16, wherein, in the transferring device, small amounts of organic components included in the rest material are transferred to the drying gas introduced into the purifying device by bringing the rest material in direct contact with the drying gas, the organic components being extracted from the transferring device together with the drying gas introduced into the purifying device.

20. A method according to claim 16, wherein the rest material is preheated before the small amounts of the organic components included in this rest material are heated in such a way that they are transformed to a gaseous state.

21. A method according to claim 16, wherein the rest material separated from the organic components in the transferring device is extracted as a condensate therefrom.

22. A method according to claim 20, wherein the rest material is preheated by being subjected to heat exchange with the condensate from the transferring device.

23. A method according to claim 16, wherein the condensing of the relatively difficultly volatilized components of the drying gas takes place in a plurality of steps, the relatively easily volatilized components from a previous step being separated into relatively difficultly volatilized components and relatively easily volatilized components in a subsequent step by condensing the relatively difficultly volatilized components in the subsequent step.

24. A method according to claim 16, wherein the condensing of the relatively difficultly volatilized components of the drying gas takes place in a plurality of steps, and the relatively difficultly volatilized components are heated by being brought in direct contact with the drying gas introduced in the purifying device, the organic components of the relatively difficultly volatilized components being evaporated and extracted from the transferring device together with the drying gas introduced in the purifying device.

25. A method according to claim 16, wherein organic components are separated from relatively difficultly volatilized components condensed in each condensation step.

26. A method according to claim 16, wherein relatively easily volatilized components from a final condensing step are combusted in a combusting device, combustion gases being formed.

27. A method according to claim 26, wherein a flow in the wood drying device is heated by being subjected to heat exchange with the combustion gases.

28. A method according to claim 16, wherein the organic components are separated by means of at least one of decanting, extraction and adsorption.

29. A method according to claim 16, wherein the wood drying device is operating under a slightly reduced pressure, atmospheric pressure or overpressure.

* * * * *